United States Patent

Kameyama et al.

(10) Patent No.: US 8,015,836 B2
(45) Date of Patent: Sep. 13, 2011

(54) HEAT PUMP SYSTEM

(75) Inventors: Junichi Kameyama, Tokyo (JP); Tomohiko Kasai, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 85 days.

(21) Appl. No.: 12/517,308

(22) PCT Filed: Mar. 27, 2007

(86) PCT No.: PCT/JP2007/056280
§ 371 (c)(1),
(2), (4) Date: Jun. 2, 2009

(87) PCT Pub. No.: WO2008/117408
PCT Pub. Date: Oct. 2, 2008

(65) Prior Publication Data
US 2010/0050675 A1    Mar. 4, 2010

(51) Int. Cl.
*F25B 7/00* (2006.01)
(52) U.S. Cl. ............................ 62/335; 62/510
(58) Field of Classification Search ............. 62/335, 62/324.6, 434, 510, 513, 175, 238.7; 165/104.33, 165/104.28
See application file for complete search history.

(56) References Cited

U.S. PATENT DOCUMENTS

| | | | |
|---|---|---|---|
| 4,149,389 A * | 4/1979 | Hayes et al. | 62/79 |
| 4,372,129 A * | 2/1983 | Bennett et al. | 62/175 |
| 5,323,618 A * | 6/1994 | Yoshida et al. | 62/149 |
| 6,131,401 A * | 10/2000 | Ueno et al. | 62/175 |
| 6,276,152 B1 * | 8/2001 | Sibik | 62/201 |
| 6,293,119 B1 * | 9/2001 | Wenzel | 62/238.6 |
| 6,298,683 B1 * | 10/2001 | Kondo et al. | 62/335 |
| 6,301,923 B1 * | 10/2001 | Bonaquist et al. | 62/402 |
| 2006/0037329 A1 * | 2/2006 | Narayanamurthy | 62/59 |
| 2006/0168979 A1 * | 8/2006 | Kattner et al. | 62/260 |

FOREIGN PATENT DOCUMENTS

JP    03-070945 A    3/1991

(Continued)

OTHER PUBLICATIONS

International Search Report (PCT/ISA/210) dated Jun. 20, 2007.

(Continued)

*Primary Examiner* — Mohammad Ali
(74) *Attorney, Agent, or Firm* — Buchanan Ingersoll & Rooney PC

(57) ABSTRACT

A heat pump system has a single heat source unit connected to at least one load unit to heat water to a high temperature. A hot water supply system 100 (heat pump system) includes a heat source unit 10 provided with a first compressor 11, a four-way selector valve 12 and a heat source heat exchanger 13, and a load unit 50 provided with a first flow controller 51, a first load heat exchanger 52, a second compressor 53, a second load heat exchanger 54, and a second flow controller 55. A main circuit A is formed by connecting the first compressor 11, the four-way selector valve 12, the heat source heat exchanger 13, the first flow controller 51 and the first load heat exchanger 52 with a liquid pipe 1 and a gas pipe 2 sequentially. A load refrigerant circuit B is formed by connecting the second compressor 53, the second load heat exchanger 54, the second flow controller 55, and the first load heat exchanger 52 with a load refrigerant pipe line 56 sequentially.

8 Claims, 5 Drawing Sheets

FOREIGN PATENT DOCUMENTS

| | | |
|---|---|---|
| JP | 04-263758 A | 9/1992 |
| JP | 8-261599 A | 10/1996 |
| JP | 10-339511 A | 12/1998 |
| JP | 11-006665 A | 1/1999 |
| JP | 2003-314920 A | 11/2003 |
| JP | 2004-132647 A | 4/2004 |
| JP | 2004-138299 A | 5/2004 |
| JP | 2005-257231 A | 9/2005 |

OTHER PUBLICATIONS

Notification of Reasons for Refusal dated Mar. 15, 2011 issued by the Japanese Patent Office in corresponding Application No. 2009-506121, and an English-language translation thereof.

Notification of Reasons for Refusal dated Jun. 28, 2011 issued in corresponding Japanese Patent Application No. 2009-506121, and computer generated English translation thereof.

* cited by examiner

HEAT PUMP SYSTEM

TECHNICAL FIELD

The present invention relates to a heat pump system having a single heat source unit (outdoor unit) connected to at least one load unit (hot water unit or indoor unit), and more particularly, to a heat pump system capable of heating water for hot water supply to a high temperature.

BACKGROUND ART

Generally, a multi-type air conditioning system having a single heat source unit connected to plural load units in parallel via two refrigerant pipes has been known. The aforementioned air conditioning system is formed of the heat source unit including a compressor, a four-way selector valve and an outdoor heat exchanger (a heat source heat exchanger), and the load unit including a throttle and an indoor heat exchanger (a load heat exchanger). The above-structured air conditioning system allows the respective load units to perform such operations as hot water supply, cooling, and heating selectively and independently. In other words, the system allows one indoor unit to perform the cooling, another indoor unit to perform the heating, and still another indoor unit to perform the hot water supply simultaneously.

There has been introduced an air conditioning system in which a single heat source unit, which is formed of a refrigerant compressor, a four-way selector valve, a heat source heat exchanger, an accumulator, a refrigerant flow passage selector unit, and the like, is connected to at least one indoor unit, which is formed of an indoor heat exchanger, a first refrigerant flow controller, and the like, and to at least one first water temperature controller, which is formed of a first water consuming side heat exchanger to perform heat exchange between the refrigerant from the heat source unit and water fed to the water consuming unit, a water consuming side refrigerant flow controller, and the like, in parallel via first and second connector pipes, and the first branch portion and the second branch portion are connected via the second refrigerant flow controller. The first branch portion includes a switch valve which selectively connects one of refrigerant outlet/inlet of the indoor heat exchanger for the indoor unit, or one of refrigerant outlet/inlet of the heat exchanger for the first water consuming unit to the first or the second connector pipe. The second branch portion connects the other of the refrigerant outlet/inlet of the heat exchanger for the indoor unit or the other of the refrigerant outlet/inlet of the heat exchanger for the first water consuming unit to the second connector pipe via the first refrigerant flow controller (see Patent Document 1).

This air conditioning system does not have to be equipped with two heat source units for air conditioning and for water heating, respectively, and allows the respective indoor units to perform operation for the hot water supply, cooling, and heating with the simple structure. This makes it possible to reduce the costs for preparing such facility as the heat source unit for heating water and maintaining the operation. The system allows efficient re-use of the exhaust heat generated in the cooling operation through the first water temperature controller especially in the intermediate season like spring and autumn when both the cooling and heating operations are likely to be performed. This makes it possible to reduce the energy consumption.

[Patent Document 1] Japanese Unexamined Patent Application publication No. 8-261599 (p. 4, FIG. 1)

DISCLOSURE OF INVENTION

Problems to be Solved by the Invention

The aforementioned air conditioning system is equipped with the single heat source unit connected to the load units in parallel so as to cover such operations as the hot water supply, the cooling and the heating. As a result, the system limits the versatility of a load unit performing an operation for the hot water supply. More specifically, the use of the load unit is limited to the case where the high temperature water is not required, for example, the heated pool. The load unit may be provided with the hot water tank for accumulating the boiled water so as to be supplied. However, the water is required to be boiled and kept at the high temperature so as to be supplied. This may deteriorate the total operation efficiency. Accordingly, the system which realizes not only the aforementioned effect derived from the air conditioning system but also versatile use of the load unit has been demanded.

In consideration of the aforementioned problem, it is an object of the present invention to provide a heat pump system having the single heat source unit connected to at least one load unit, which is capable of heating water to the high temperature without making the circuit structure complicated.

Means for Solving the Problems

A heat pump system according to an aspect of the present invention is provided with a heat source unit including a first compressor, a flow passage switch valve and a heat source heat exchanger, and a first load unit including a first flow controller, a first load heat exchanger, a second compressor, a second load heat exchanger, and a second flow controller. A main circuit is formed by connecting the first compressor, the flow passage switch valve, the heat source heat exchanger, the first flow controller and the first load heat exchanger sequentially with a refrigerant pipe line. A load refrigerant circuit is formed by connecting the second compressor, the second load heat exchanger, the second flow controller, and the first load heat exchanger sequentially with a load refrigerant pipe line.

A heat pump system according to another aspect of the present invention is provided with a heat source unit including a first compressor, a flow passage switch valve, and a heat source heat exchanger, and a first load unit including a first flow controller and a first load heat exchanger. A main circuit is formed by connecting the first compressor, the flow passage switch valve, the heat source heat exchanger, the first flow controller and the first load heat exchanger sequentially with a refrigerant pipe line. The first load unit includes a first check valve disposed in a refrigerant pipe connected to one end of an outlet/inlet of the first load heat exchanger to allow the refrigerant to flow only in a direction from the one end of the outlet/inlet of the first load heat exchanger to the other end, a second check valve disposed in a refrigerant pipe connected to the other end of the outlet/inlet of the first load heat exchanger to allow the refrigerant to flow only in a direction from the one end of the outlet/inlet of the first load heat exchanger to the other end, a first bypass pipe branched in the refrigerant pipe at a point downstream of the second check valve to be connected between the first check valve and the first load heat exchanger, a third check valve disposed in the first bypass pipe to allow the refrigerant to flow only in a direction from the branch point to the connecting point, a second bypass pipe branched in the refrigerant pipe at a portion between the first load heat exchanger and the second check valve to be connected to a portion upstream of the first check valve, and a fourth check valve disposed in the second bypass pipe to allow the refrigerant to flow only in a direction from the branch point to the connecting point.

A heat pump system according to another aspect of the present invention is provided with a heat source unit including a first compressor, a flow passage switch valve and a heat source heat exchanger, and a first load unit including a first flow controller, a first load heat exchanger, a second compressor, a second load heat exchanger, and a second flow controller. A main circuit is formed by sequentially connecting the first compressor, the flow passage switch valve and the heat source heat exchanger, the first flow controller and the first load heat exchanger with a refrigerant pipe line. A load refrigerant circuit is formed by sequentially connecting the second compressor, the second load heat exchanger, the second flow controller, and the first load heat exchanger with a refrigerant pipe line. The first load unit includes a first check valve disposed in a refrigerant pipe connected to one end of an outlet/inlet of the second load heat exchanger to allow the refrigerant to flow only in a direction from the one end of the outlet/inlet of the second load heat exchanger to the other end, a second check valve disposed in the refrigerant pipe connected to the other end of the outlet/inlet of the second load heat exchanger to allow the refrigerant to flow only in a direction from the one end of the outlet/inlet of the second load heat exchanger to the other end, a first bypass pipe branching off from the refrigerant pipe line at a point downstream of the second check valve to be connected to a point between the first check valve and the second load heat exchanger, a third check valve disposed in the first bypass pipe to allow the refrigerant to flow only in a direction from the branch point to the connecting point, a second bypass pipe branching off from the refrigerant pipe line at a point between the second load heat exchanger and the second check valve to be connected to a portion upstream of the first check valve, and a fourth check valve disposed in the second bypass pipe to allow the refrigerant to flow only in a direction from the branch point to the connecting point.

Advantages

As the heat pump system according to the present invention is equipped with the load refrigerant circuit in addition to the main circuit for the air conditioning, water cooling or water heating can be performed with the load refrigerant circuit. Therefore, the operation efficiency may be improved. The use of the load refrigerant circuit may intensify the performance of the main circuit to improve the operation efficiency. The first load unit may be used for heating water to the high temperature.

As the heat pump system according to the present invention allows the refrigerant in the main circuit to flow only in one direction in the first load heat exchanger, the heat exchange efficiency in the first load heat exchanger may be improved. The flow of water and the flow of the refrigerant are made opposite when using the first load unit for heating water, thus improving the heat exchanging efficiency.

As the heat pump system according to the present invention is equipped with the load refrigerant circuit and allows the refrigerant in the load refrigerant circuit to flow only in one direction in the second load heat exchanger, the heat exchange efficiency in the second load heat exchanger may further be improved. When the first load unit is used for heating water, water may be heated to the high temperature while improving the heat exchange efficiency in the second load heat exchanger.

Figure 1:
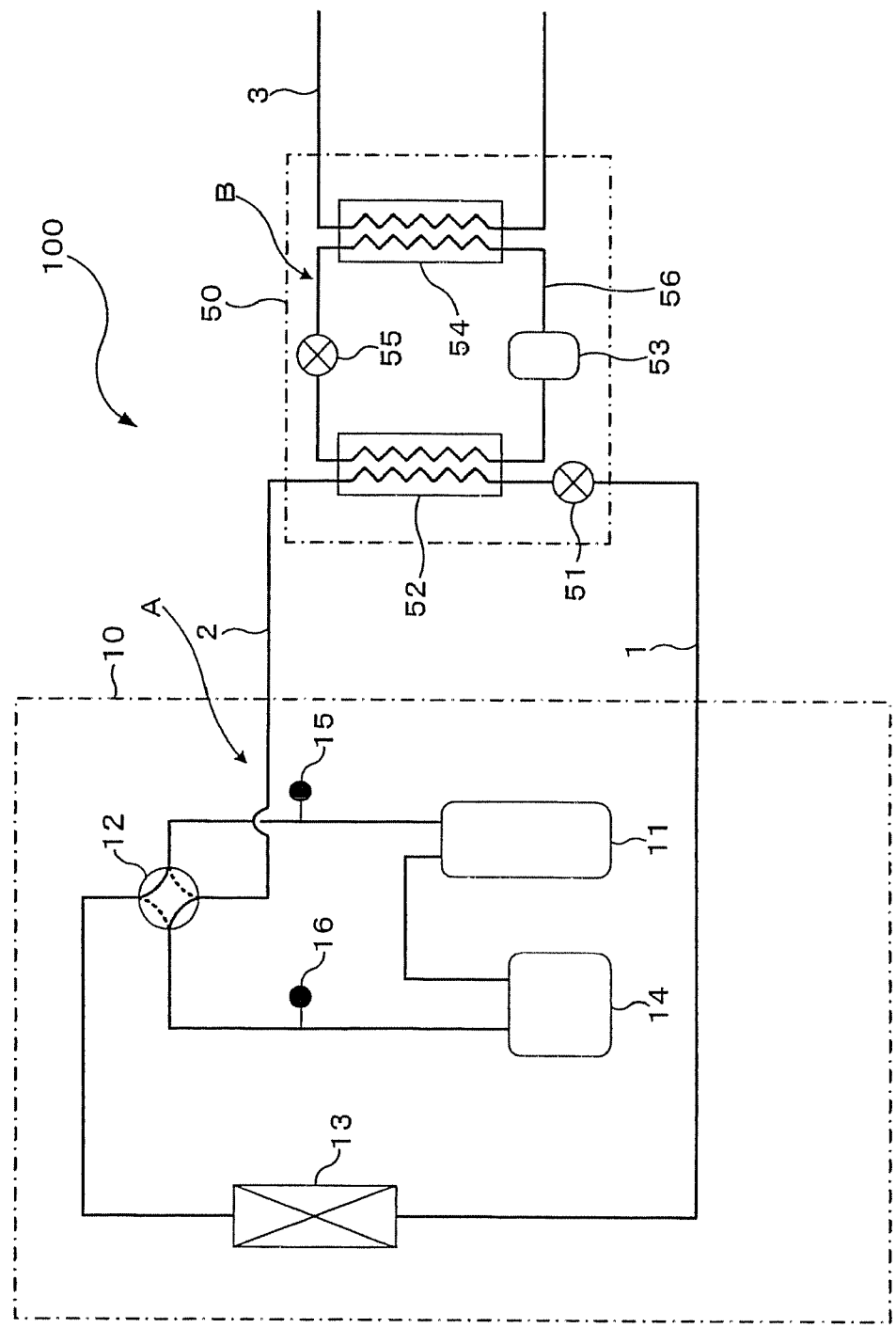
FIG. 1 shows a structure of a refrigerant circuit for a hot water supply system according to Example 1.

REFERENCE NUMERALS 1 liquid pipe,
2 gas pipe,
3 water pipe,
4 first connector pipe,
5 second connector pipe,
6 bypass pipe,
8 branch pipe,
8a branch pipe
8b branch pipe,
9 branch pipe,
9a branch pipe,
9b branch pipe,
10 heat source unit,
11 first compressor,
12 four-way selector valve,
13 heat source heat exchanger,
14 accumulator,
15 discharge pressure detector,
16 intake pressure detector,
22 joint portion,
23 joint portion,
30 relay unit,
31 second heat exchanger,
32 third check valve,
33 fourth check valve,
34 fifth check valve,
35 sixth check valve,
36 gas-liquid separator,
37 first heat exchanger,
38 second flow controller,
39 third flow controller,
40 second branch portion,
41 first branch portion,
42 second check valve,
43 first check valve,
44 first valve unit,
45 second valve unit,
46 pressure detector,
47 pressure detector,
50 load unit,
50' load unit,
50a load unit,
50b load unit,
51 first flow controller,
51a first flow controller,
51b first flow controller,
52 first load heat exchanger,
52a first load heat exchanger, 52b first load heat exchanger,
53 second compressor,
54 second load heat exchanger,
55 second flow controller,
56 load refrigerant pipe,
61 bypass pipe,
62 bypass pipe,
63 seventh check valve,
64 eighth check valve,
65 ninth check valve,
66 tenth check valve,
100 hot water supply system,
200 hot water supply air conditioning system,
300 hot water supply air conditioning system,
400 hot water supply system

BEST MODE FOR CARRYING OUT THE INVENTION

Examples of the present invention will be described referring to the drawings.

Example 1

FIG. 1 is a view showing the structure of a refrigerant circuit in a hot water supply system 100 according to Example 1. Referring to FIG. 1, the structure of the refrigerant circuit in the hot water supply system 100 will be described. The hot water supply system 100 is a heat pump system installed in a building or a condominium, for supplying water at a low temperature, an intermediate temperature, or a high temperature to be used for heated pool, floor heating, shower, bath, drink and the like, using a refrigerating cycle (heat pump cycle) for circulating the refrigerant. In the drawings, the correlation among components in the circuit with respect to the size may differ from the one among those of the actual system.

The hot water supply system 100 is mainly formed of a heat source unit 10 and a load unit 50 (first load unit). The heat source unit 10 and the load unit 50 are connected with a liquid pipe 1 and a gas pipe 2 both as the refrigerant pipes sequentially so as to communicate with each other. A main circuit A is formed by connecting various refrigerating units in the heat source unit 10 to refrigerant units (a first flow controller 51 and a first load heat exchanger 52) in the heat source unit 50 via the liquid pipe 1 and the gas pipe 2. A second load heat exchanger 54 in the load unit 50 communicates with a water pipe 3 for supplying water heated or cooled by the second load heat exchanger 54 to a predetermined location.

A first compressor 11 serving as a refrigerating unit, a four-way selector valve 12 as a flow passage switch valve, a heat source heat exchanger 13, and an accumulator 14 are installed in the heat source unit 10. The heat source unit 10 is further provided with a discharge pressure detector 15 as a pressure sensor for detecting the pressure of the refrigerant discharged from the first compressor 11, and an intake pressure detector 16 as a pressure sensor for detecting the pressure of the refrigerant sucked into the first compressor 11 as well as air blow means like a fan for supplying air to the heat source heat exchanger 13 and a controller for controlling the first compressor 11 and the four-way selector valve 12, both of which are not shown.

The first compressor 11 sucks the refrigerant flowing through the liquid pipe 1 to compress the refrigerant so as to be brought into the high temperature/high pressure state. Preferably, it is structured as the type having the rotational number and capacity controlled by the inverter. The four-way selector valve 12 serves to switch the flow of the refrigerant upon supply of the hot water or cold water. The heat source heat exchanger 13 functions as an evaporator upon supply of the hot water, and functions as a condenser upon supply of the cold water such that the heat exchange is performed between air supplied from the air blow means (not shown) and the refrigerant, and the refrigerant is vaporized to gas or condensed to liquid.

The accumulator 14 is disposed between the four-way selector valve 12 and the first compressor 11 for accumulating excessive refrigerant. It allows gas-liquid separation. An arbitrary container may be employed as the accumulator 14 so long as it is capable of storing the excessive refrigerant. The discharge pressure detector 15 is disposed in an exhaust pipe between the first compressor 11 and the four-way selector valve 12 for detecting the pressure of the refrigerant discharged from the first compressor 11. The intake pressure detector 16 is disposed in an intake pipe between the four-way selector valve 12 and the accumulator 14 for detecting the pressure of the refrigerant sucked into the first compressor 11. The pressure information detected by the discharge pressure detector 15 and the intake pressure detector 16 is transmitted to a control unit (not shown).

The load unit 50 includes a first flow controller 51, a first load heat exchanger 52, a second compressor 53, a second load heat exchanger 54, and a second flow controller as refrigerating units. The first load heat exchanger 52, the second compressor 53, the second load heat exchanger 54, and the second flow controller are sequentially connected with a load refrigerant pipe line 56 so as to enable them to communicate with one another. The respective refrigerating units in the load unit 50 are connected with the load refrigerant pipe line 56 to form a load refrigerant circuit B. An air blow means (not shown) like a fan for supplying air to the first load heat exchanger 52 may also be provided.

The first flow controller 51 functions as a reducing valve and an expansion valve to reduce the pressure of the refrigerant so as to be expanded. It is preferable to employ an electronic expansion valve which can be controlled to make the opening degree variable for the first flow controller 51. To supply cold water, preferably, the first flow controller 51 controls the opening state in accordance with the overheat level at the outlet of the first load heat exchanger 52. To supply hot water, preferably, the first flow controller 51 controls the opening state in accordance with the supercool level at the outlet of the first load heat exchanger 52. The first load heat exchanger 52 functions as a condenser when supplying hot water, and functions as an evaporator when supplying cold water, so that the heat exchange between air supplied from the air blow means (not shown) and the refrigerant is performed and the refrigerant is condensed to liquid or vaporized to gas.

The second compressor 53 sucks the refrigerant flowing through the load refrigerant pipe line 56 so as to compress it into the high temperature/high pressure state, which may be formed of the type having the rotational number and the capacity controlled by an inverter, for example. The second load heat exchanger 54 functions as the condenser when supplying hot water, and as the evaporator when supplying cold water such that the heat exchange is performed between water passing through the water pipe 3 and the refrigerant, and the refrigerant is condensed to liquid or vaporized to gas. The second flow controller 55 serves as a reducing valve and an expansion valve to reduce the pressure of the refrigerant so as to be expanded. Preferably, the electronic expansion valve having a variably controllable opening may be employed for the first flow controller 51.

The hot water system 100 includes two refrigerating cycles (main circuit A and the load refrigerant circuit B) to allow water passing through the water pipe 3 to be heated to the high temperature. The load refrigerant circuit B in the load unit 50 functions to intensify the performance of the main circuit A. In this case, water passing through the water pipe 3 is heated. However, the present invention is not limited to the one as described above. Water passing through the water pipe 3 may be cooled by switching the flow of the refrigerant passing through the load refrigerant pipe 56 using the four-way selector valve disposed in the load unit 50.

The operation of the hot water supply system 100 will be described.

The operation for supplying the cold water will be described. First of all, the refrigerant is brought into the high temperature/high pressure state by the first compressor 11, and discharged therefrom to flow into the heat source heat exchanger 13 via the four-way selector valve 12. The refrigerant flowing into the heat source heat exchanger 13 is condensed into liquid through the heat exchange with outdoor air. That is, the refrigerant radiates heat so as to be transformed into liquid. The condensed and liquefied refrigerant flows into the first flow controller 51 in the load unit 50 through the liquid pipe 1. Preferably, the capacity of the first compressor 11 is controlled such that the pressure of the refrigerant detected by the intake pressure detector 16 becomes the predetermined pressure.

The refrigerant flowing into the first flow controller 51 is depressurized so as to be transformed into a low pressure gas-liquid state. The refrigerant in the two-phase state flows into the first load heat exchanger 52 to exchange heat with outdoor air so as to be vaporized to gas. That is, heat is absorbed from outdoor air (cooling outdoor air) to vaporize the refrigerant to gas. The thus gaseous refrigerant flows from the first load heat exchanger 52 through the gas pipe 2, and is further sucked into the first compressor 11 again via the four-way selector valve 12 and the accumulator 14.

Meanwhile, in the load unit 50, the refrigerant which has been brought into the high temperature/high pressure state by the second compressor 53 is discharged therefrom to flow into the first load heat exchanger 52 via the four-way selector valve (not shown). The condensed and refrigerant flowing into the first load heat exchanger 52 exchanges heat with the refrigerant flowing through the main circuit A, and is condensed to liquid. That is, the refrigerant radiates heat to be transformed into the liquid. The condensed and liquefied refrigerant flows through the load refrigerant pipe 56 into the second flow controller 55. The refrigerant flowing into the second flow controller 55 is depressurized, and transformed into a low pressure gas-liquid state.

The refrigerant in the aforementioned two-phase state flows into the second load heat exchanger 54, and exchanges heat with water passing through the water pipe 3 so as to be vaporized to gas. That is, the refrigerant absorbs heat from water (cooling water) to be transformed into the gas. The vaporized gaseous refrigerant is discharged from the second load heat exchanger 54 to be sucked by the second compressor 53 again via the four-way selector valve. In this way, water passing through the water pipe 3 may be cooled to supply cold water. The load refrigerant circuit B is disposed between the main circuit A and the water pipe 3 to improve the performance of the hot water supply system 100 compared with the use of the main circuit A for directly cooling water.

The operation for supplying hot water will be described. The refrigerant which has been brought into the high temperature/high pressure state by the first compressor 11 is discharged therefrom to flow into the first load heat exchanger 52 in the load unit 50 via the four-way selector valve 12. It is preferable to control the capacity of the first compressor 11 such that the pressure of the refrigerant detected by the discharge pressure detector 15 becomes the predetermined pressure. The refrigerant flowing into the first load heat exchanger 52 exchanges heat with the refrigerant flowing through the load refrigerant circuit B so as to be condensed to liquid. That is, the refrigerant radiates heat to be transformed into the liquid. The liquefied refrigerant flows into the first flow controller 51 through the liquid pipe 1.

The refrigerant flowing into the first flow controller 51 is depressurized, and is transformed into a low pressure gas-liquid state. The refrigerant in the two-phase state is discharged from the load unit 50, and further flows into the heat source heat exchanger 13 to exchange heat with outdoor air to be vaporized to gas. That is, the refrigerant absorbs heat from outdoor air (cooling outdoor air) to be transformed into the gas. The gaseous refrigerant is discharged from the heat source heat exchanger 13 and sucked into the first compressor 11 again through the gas pipe 2 via the four-way selector valve 12 and the accumulator 14.

Meanwhile, in the load unit 50, the refrigerant which has been brought into the high temperature/high pressure state by the second compressor 53 is discharged therefrom to flow into the second load heat exchanger 54 via the four-way selector valve (not shown). The refrigerant flowing into the second load heat exchanger 54 exchanges heat with water passing through the water pipe 3 so as to be condensed to liquid. That is, the refrigerant radiates heat (heating water) to be transformed into the liquid. The condensed and liquefied refrigerant flows into the second flow controller 55 through the load refrigerant pipe line 56. The refrigerant flowing into the second flow controller 55 is depressurized and transformed into the low pressure gas-liquid state.

The refrigerant in the two-phase state flows into the first load heat exchanger 52 to exchange heat with the refrigerant flowing through the main circuit A so as to be vaporized to gas. That is, heat is absorbed from the refrigerant (cooling the refrigerant) so as to be transformed into the gas. The vaporized gaseous refrigerant is discharged from the first load heat exchanger 52, and sucked into the second compressor 53 again via the four-way selector valve. The temperature of the refrigerant which is vaporized by the first load heat exchanger 52 is 50° C. or higher. That is, the high temperature gas refrigerant vaporized by the first load heat exchanger 52 is sucked into the second compressor 53 so as to be compressed and discharged.

The resultant refrigerant gas exchanges heat with water passing through the water pipe 3 in the second load heat exchanger 54, so as to be condensed and liquefied. The temperature of the refrigerant which is condensed to liquid becomes 80 to 100° C. sufficient to heat water to the high temperature. In this way, water passing through the water pipe 3 may be heated to supply hot water at the high temperature. The load refrigerant circuit B disposed between the main circuit A and the water pipe 3 may improve the performance of the hot water supply system 100 compared with the use of the main circuit A for directly heating water. The first flow controller 51 may be provided inside the heat source unit 10.

Figure 2:
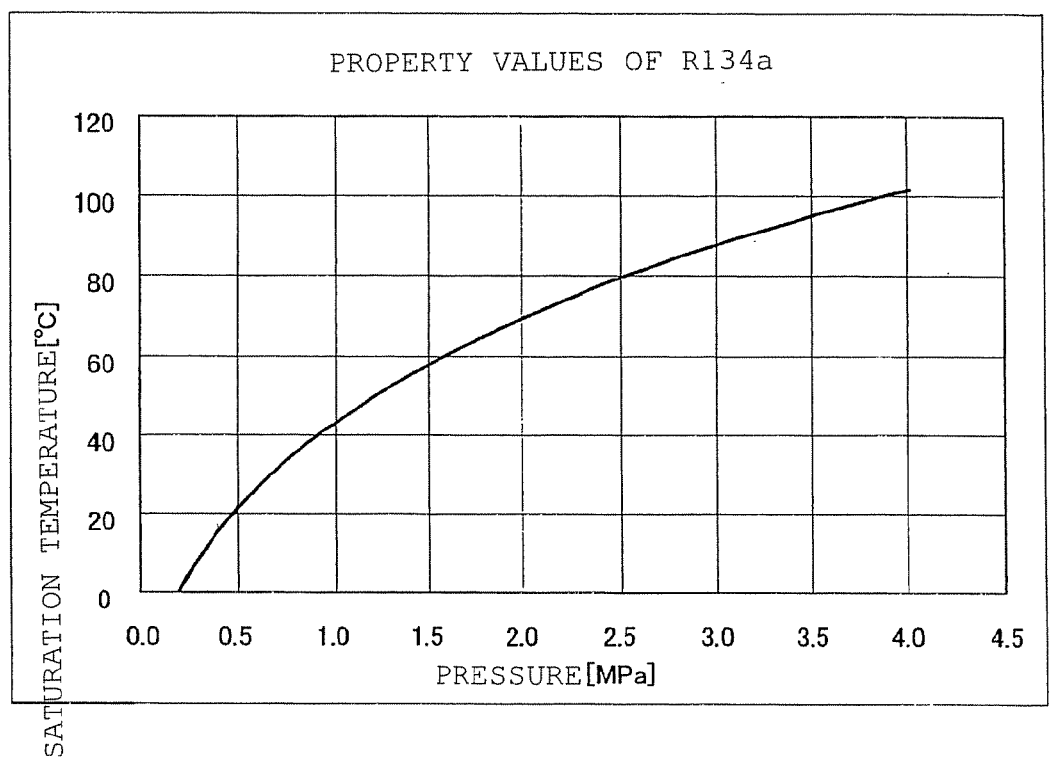
FIG. 2 is a graph showing the property value of the refrigerant usable in the load refrigerant circuit.

FIG. 2 is a graph showing the property values of the refrigerant usable for the load refrigerant circuit B. An exemplary refrigerant usable for the load refrigerant circuit B will be described referring to FIG. 2. FIG. 2 shows the property values of R134a as the refrigerant with the x-axis as pressure [MPa] and the y-axis as saturation temperature [° C.]. Referring to FIG. 2, the condensation pressure is kept below 4 MPa even if the condensation temperature becomes 100° C. The load refrigerant pipe line 56 may be formed of a general material without requiring the use of the one with specific resistance to pressure.

As the existing pipe line is used or the load refrigerant pipe line requires no specific material, costs for manufacturing and providing the load unit 50 may be reduced. This makes it possible to heat water to the high temperature with the safe structure. The refrigerant usable for the load refrigerant circuit B is not limited to R134a. The arbitrary refrigerant may be used for the load refrigerant circuit B so long as it exhibits the property values approximate to those shown in FIG. 2. For example, a zeotropic refrigerant mixture, a quasi azeotropic refrigerant mixture, a single refrigerant, or the like with property values approximate to those of the R134a may be used. If the pressure-resistant pipe can be produced at low costs, the refrigerant with the high operation pressure may be used.

The refrigerant used for the load refrigerant circuit B has been described. The refrigerant used for the main circuit A is not limited to the specific type. For example, it may be selected from the zeotropic refrigerant mixture (R407C), the quasi azeotropic refrigerant mixture (R410A, R404A), the single refrigerant (carbon dioxide, propane, isobutane, ammonia) depending on the installation place or the use of the hot water supply system 100. The load unit 50 may be operated as the indoor unit by replacing the hot water supply system 100 with the air conditioning system. In this case, the operation for supplying cold water corresponds with the cooling operation, and the operation for supplying hot water corresponds with the heating operation.

Example 2

Figure 3:
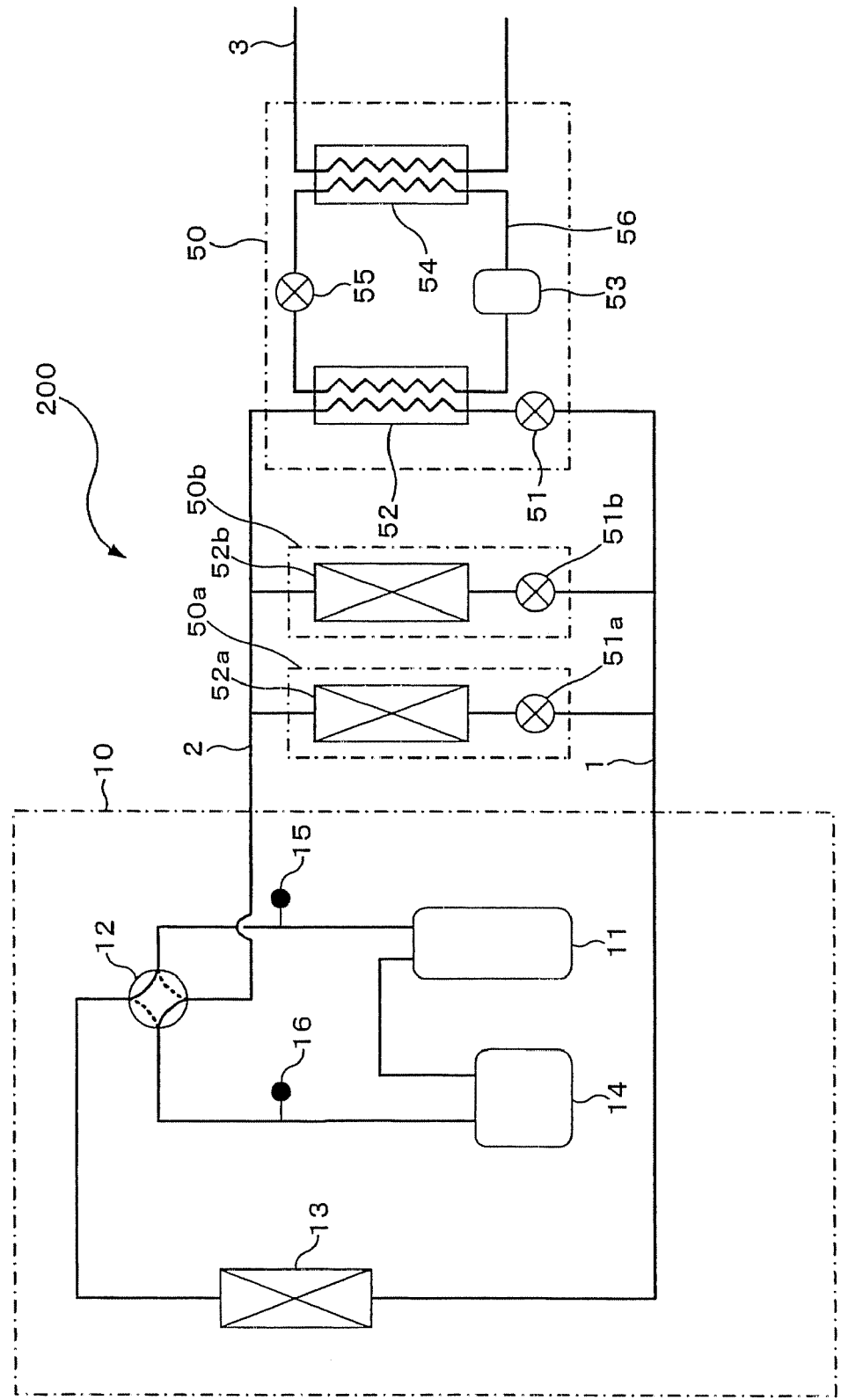
FIG. 3 shows a structure of a refrigerant circuit in the hot water supply air conditioning system according to Example 2.

FIG. 3 shows a structure of a refrigerant circuit in a hot water supply air conditioning system 200 according to Example 2. Referring to FIG. 3, the structure of the refrigerant circuit in the hot water supply air conditioning system 200 will be described. The hot water supply air conditioning system 200 includes the hot water supply system 100 according to Example 1, and is connected to other load units in parallel. The hot water supply air conditioning system 200 is installed in a building or a condominium as the heat pump system which allows the respective load units to perform the hot water supply operation, cooling operation, and heating operation individually and independently. In the example, the feature different from that of Example 1 will only be described, and the same elements as those shown in Example 1 will be designated with the same reference numerals, and explanations thereof, thus will be omitted.

In Example 1, the single load unit 50 is used for supplying hot water. In Example 2, the load unit 50 is used for supplying hot water, and load units 50a (second load unit) and load unit 50b (second load unit) are used for performing air conditioning as the indoor units. That is, the load unit 50 is operated for supplying hot water or cold water, and the load units 50a and 50b are operated for cooling or heating a room, so that respective load units can be operated individually and independently.

In the load unit 50a, a first flow controller 51a and a first load heat exchanger 52a as refrigerating units are installed and connected in series. The load unit 50a is connected to the main circuit A so as to be in parallel with the load unit 50. Air blow means (not shown) such as a fan for supplying air to the first load heat exchanger 52a is provided. In the load unit 50b, the first flow controller 51b and the first load heat exchanger 52b as the refrigerating units are installed and connected in series. The load unit 50b is connected to the main circuit A so as to be in parallel with the load unit 50. Air blow means (not shown) such as the fan for supplying air to the first load heat exchanger 52b is provided.

The first flow controllers 51a and 51b function as a depressurizing valve or an expansion valve likewise the first flow controller 51 for the purpose of reducing the pressure of the refrigerant to be expanded. It is preferable to employ the electronic expansion valve and the like having a variably controllable opening for the flow controllers 51a and 51b. Preferably, each opening of the first flow controllers 51a and 51b is controlled in accordance with the overheat level at the outlet of the first load heat exchangers 52a and 52b upon cooling, and in accordance with the supercool level at the outlet of the first load heat exchangers 52a and 52b upon heating, respectively. The first load heat exchangers 52a and 52b function as the condenser upon heating, and functions as the evaporator upon cooling so as to perform the heat exchange between air supplied from the air blow means (not shown) and the refrigerant to be condensed to liquid or to be vaporized to gas.

Operations of the hot water supply air conditioning system 200 will be described.

The cooling operation will be described first. The refrigerant is brought into the high temperature/high pressure state by the first compressor 11, and discharged therefrom to flow into the heat source heat exchanger 13 via the four-way selector valve 12. The refrigerant flowing into the heat source heat exchanger 13 exchanges heat with outdoor air so as to be condensed to liquid. That is, the refrigerant radiates heat and is transformed into the liquid. The condensed and liquefied refrigerant flows into the first flow controllers 51, 51a and 51b of the load units 50, 50a and 50b, respectively, through the liquid pipe 1. Preferably, the capacity of the first compressor 11 is controlled such that the pressure of the refrigerant detected by the intake pressure detector 16 becomes the predetermined pressure.

The refrigerant flowing into the first flow controllers 51, 51a and 51b is depressurized and transformed into the low pressure gas-liquid state. The refrigerant in the two-phase state flows into the first load heat exchangers 52a and 52b in the load units 50a and 50b, respectively, to exchange heat with outdoor air, and is vaporized to gas. That is, the refrigerant absorbs heat from outdoor air (cooling outdoor air), so as to be transformed into gas. The vaporized gaseous refrigerant flows out from the first load heat exchangers 52a and 52b to be sucked into the first compressor 11 again through the gas pipe 2 via the four-way selector valve 12 and the accumulator 14.

Meanwhile, as described in Example 1, the heat exchange is performed between the load refrigerant circuit B and the main circuit A in the load unit 50 to cool water passing through the water pipe 3 for supplying cold water. The hot water supply air conditioning system 200 allows the load units 50a and 50b to cool air upon cooling operation so as to cool the room. In the load unit 50, water passing through the water pipe 3 is cooled to supply cold water. That is, the room cooling operation and the water cooling operation may be simultaneously performed by the same heat source unit 10.

The heating operation will be described. The refrigerant is brought into the high temperature/high pressure state by the first compressor 11, and discharged therefrom to flow into the first load heat exchangers 52, 52a and 52b in the load units 50, 50a and 50b, respectively, via the four-way selector valve 12. It is preferable to control the operation capacity of the first compressor 11 such that the pressure of the refrigerant detected by the discharge pressure detector 15 becomes a predetermined pressure. The refrigerant flowing into the first load heat exchanges 52a and 52b exchanges heat with outdoor air so as to be condensed to liquid. That is, the refrigerant radiates heat (heating outdoor air) and is transformed into the liquid. The condensed and liquefied refrigerant flows into the first flow controllers 51a and 51b through the liquid pipe 1.

Meanwhile, as described in Example 1, the heat exchange is performed between the load refrigerant circuit B and the main circuit A in the load unit 50 to heat water passing through the water pipe 3 for supplying hot water. The refrigerant flowing into the first flow controllers 51, 51a and 51b is depressurized and transformed into the low pressure gas-liquid state. The refrigerant in the two-phase state is discharged from the load units 50, 50a and 50b to flow into the heat source heat exchanger 13 where heat is exchanged with outdoor air, and is vaporized to gas. That is, the refrigerant absorbs heat from outdoor air (cooling outdoor air) so as to be transformed into the gas. The vaporized gaseous refrigerant is discharged from the heat source heat exchanger 13 to be sucked into the first compressor 11 again through the gas pipe 2 via the four-way selector valve 12 and the accumulator 14.

When the hot water supply air conditioning system 200 is operated for heating, the load units 50a and 50b are operated to warm air to heat the inside of the room, and the load unit 50 is operated to heat water passing through the water pipe 3 to supply hot water. The use of the single heat source unit 10 is capable of performing both the room heating and water heating simultaneously. The hot water air conditioning system 200 allows the load units 50, 50a and 50b to be operated in various modes.

The load unit 50 may be used as the indoor unit while using the load unit 50a or 50b for supplying hot water. FIG. 3 shows the example where the single load unit for supplying hot water, and two load units for conditioning air are employed. However, the invention is not limited to the combination as described above. For example, two load units or four or more load units may be provided in the hot water supply air conditioning system 200. The use of the respective load units may be determined in accordance with the installation place or application. The first flow controllers 50, 50a and 50b may be installed within the heat source unit 10.

Example 3

Figure 4:
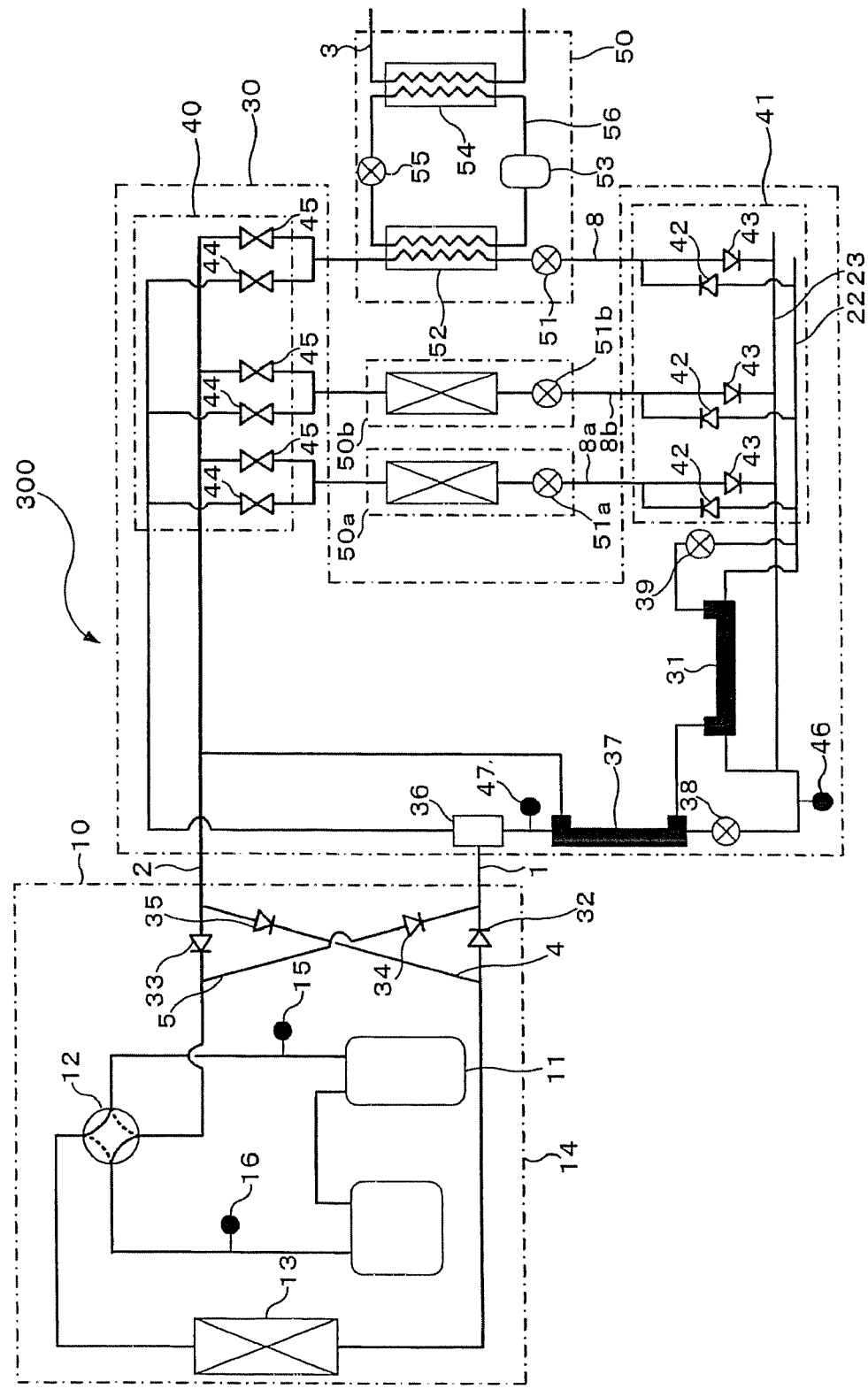
FIG. 4 shows a structure of a refrigerant circuit in the hot water supply air conditioning system according to Example 3.

FIG. 4 shows the structure of a refrigerant circuit in a hot water supply air conditioning system 300 according to Example 3 of the present invention. Referring to FIG. 4, the structure of the refrigerant circuit in the hot water supply air conditioning system 300 will be described. Likewise the hot water supply air conditioning system 200 according to Example 2, the hot water supply air conditioning system 300 is installed in a building and a condominium as a heat pump system to allow the respective load units to individually and independently perform the hot water supply, cooling of the room, and heating of the room. In the example, the feature different from those of Examples 1 and 2 will only be described, and the same elements as those shown in Examples 1 and 2 will be designated with the same reference numerals, and explanations thereof, thus will be omitted.

In Example 2, three load units are simply connected in parallel. Meanwhile in Example 3, three load units are connected in parallel, and a relay unit 30 is employed to allow efficient operations performed by the respective load units (cooling and heating the room, and cooling and heating water). The hot water supply air conditioning system 200 is structured to allow the respective load units to individually and independently perform the operations efficiently.

In the heat source unit 10, the liquid pipe 1 and the gas pipe 2 are connected with first and second connector pipes 4 and 5. The first connector pipe 4 is provided with a sixth check valve 35 which allows the refrigerant to flow only in the direction from the gas pipe 2 to the liquid pipe 1. The second connector pipe 5 is also provided with a fifth check valve 34 which allows the refrigerant to flow only in the direction from the gas pipe 2 to the liquid pipe 1. The liquid pipe 1 is provided with a third check valve 32 between portions jointed to the first and the second connector pipes 4 and 5. The gas pipe 2 is provided with a fourth check valve 33 between portions jointed to the first and the second connector pipes 4 and 5. The third check valve 32 is structured to allow only the refrigerant flowing from the heat source heat exchanger 13 to pass therethrough, and the fourth check valve 33 is structured to allow only the refrigerant flowing toward the four-way selector valve 12 to pass therethrough.

The relay unit 30 is disposed between the heat source unit 10 and the respective load units. The relay unit 30 is connected to the heat source unit 10 with the gas pipe 2 connected to the four-way selector valve 12 and the liquid pipe 1 connected to the heat source heat exchanger 13. The relay unit 30 is further connected to the respective load units with branch pipes 9a, 9b and 9 on the load unit side connected to the first load heat exchangers 52a, 52b and 52 of the respective load units 50a, 50b and 50, and branch pipes 8a, 8b and 8 on the load unit side connected to the first flow controllers 51a, 51b and 51 of the respective load units 50a, 50b and 50.

The relay unit 30 includes a first branch portion 41, a second flow controller 38, a second branch portion 40, a gas-liquid separator 36, a first heat exchange portion 37, a second heat exchange portion 31 and a third flow controller 39. The second branch portion 40 is structured to selectively connect the branch pipes 9a, 9b and 9 on the load unit side to the gas pipe 2 or the liquid pipe 1. The second branch portion 40 is formed of three second valve units 45 each having one end connected to the branch pipes 9a, 9b or 9 on the load unit side and the other end collectively connected to the gas pipe 2, and three first valve units 44 each having one end connected to the branch pipes 9a, 9b or 9 on the load unit side and the other end collectively connected to the liquid pipe 1.

In the second branch portion 40 of the relay unit 30, the first valve units 44 are closed and the second valve units 45 are opened by a control unit (not shown) so as to connect the branch pipes 9a, 9b and 9 on the load unit side to the gas pipe 2 to determine the refrigerant flow. In the second branch portion 40 of the relay unit 30, the first valve units 44 are opened and the second valve units 45 are closed by the control unit (not shown) so as to connect the branch pipes 9a, 9b and 9 on the load unit side to the liquid pipe 1 to determine the refrigerant flow.

The first branch portion 41 of the relay unit 30 includes first and second check valves 43 and 42 with each end connected to the branch pipes 8a, 8b and 8 at the load unit side in inverse parallel, a joint portion 23 connected to the respective other ends of the first check valves 43, and a joint portion 22 connected to the respective other ends of the second check valves 42. The gas-liquid separator 36 is disposed in the intermediate portion of the liquid pipe 1 having the gas phase portion connected to the first valve units 44 in the second branch portion 40 and the liquid phase portion connected to the first branch portion 41.

The second flow controller 38 is connected between the gas-liquid separator 36 and the first branch portion 41, and serves as the depressurizing valve and the expansion valve to depressurize and expand the refrigerant. It is preferable to employ the electronic expansion valve and the like which allows the opening to be variably controlled for the second flow controller 38. A bypass pipe 6 connects the first branch portion 41 and the gas pipe 2 for allowing the refrigerant to pass therethrough. A third flow controller 39 disposed in the intermediate portion of the bypass pipe 6 functions as the depressurizing valve and the expansion valve to depressurize and expand the refrigerant. It is preferable to employ the electronic expansion valve and the like which allows the opening to be variably controlled for the second flow controller 38.

The second heat exchange portion 31 performs the heat exchange between the portion downstream of the third flow controller 39 in the bypass pipe 6 and the portion in the pipe from the second flow controller 38 to the joint portion 22 in the first branch portion 41. The first heat exchange portion 37 performs the heat exchange between the portion downstream of the second heat exchanger 31 in the bypass pipe 6 and the portion in the pipe connecting the gas-liquid separator 36 and the second flow controller 38. The relay unit 30 is provided with a pressure detector 47 disposed in the pipe from the second flow controller 38 to the gas-liquid separator 36 for detecting the pressure of the refrigerant passing therethrough, and a pressure detector 46 disposed in the pipe connecting the second flow controller 38 and the first branch portion 41 for detecting the pressure of the refrigerant passing therethrough.

The operation of the hot water supply air conditioning system 300 will be described. The hot water supply air conditioning system 300 mainly performs three types of operations including the room cooling operation by the load units 50a and 50b and water cooling operation by the load unit 50 (hereinafter referred to as room/water cooling operation), the room heating operation by the load units 50a and 50b and water heating operation by the load unit 50 (hereinafter referred to as room/water heating operation), and operations in the state where the respective load units perform different operations (hereinafter referred to as heating/cooling operation).

The room/water cooling operation will be described. The refrigerant is brought into the high temperature/high pressure state by the first compressor 11, and is discharged therefrom to flow into the heat source heat exchanger 13 via the four-way selector valve 12. The heat exchange is performed between the refrigerant flowing into the heat source heat exchanger 13 and outdoor air such that the refrigerant is condensed to liquid. In other words, the refrigerant radiates heat so as to be transformed into the liquid. The condensed and liquefied refrigerant flows into the relay unit 30 through the liquid pipe 1 via the third check valve 32. The refrigerant flowing into the relay unit 30 further flows into the first branch portion 41 via the gas-liquid separator 36 and the second flow controller 38.

The refrigerant flowing into the first branch portion 41 is branched at the joint portion 22 into the branch pipes 8a, 8b and 8, and further flows into the first flow controllers 51a and 51b of the load units 50a and 50b, respectively. It is preferable to control the operation capacity of the first compressor 11 such that the pressure of the refrigerant detected by the intake pressure detector 16 becomes a predetermined pressure. It is preferable to control each opening of the first flow controllers 51a and 51b in accordance with the overheat level at the outlets of the first load heat exchangers 52a and 52b, respectively.

Each of the refrigerant flowing into the first flow controllers 51a and 51b is depressurized so as to be transformed into a low pressure two-phase state of gas and liquid. The refrigerant in the two-phase state flows into the first load heat exchangers 52a and 52b in the load units 50a and 50b where the heat exchange is performed with outdoor air to vaporize the refrigerant to gas. That is, the refrigerant absorbs heat from interior air (cooling interior air) to be transformed into the gas. As a result, the room is cooled by the thus cooled air.

As described in Example 1, the heat exchange is performed between the load refrigerant circuit B and the main circuit A in the load unit 50 to cool water passing through the water pipe 3 to supply cold water. In the hot water supply air conditioning system 300 the load units 50a and 50b can cool air and the inside of the room in the room/water cooling operation. Meanwhile, the load unit 50 cools water passing through the water pipe 3 to supply cold water. It is preferable to control the opening of the first flow controller 51 in accordance with the overheat level at the outlet of the first load heat exchanger 52.

The refrigerant which has been gasified in the first load heat exchangers 52a, 52b and 52 flows through the branch pipes 9a, 9b and 9 to pass through the second valve units 45 in the second branch portion 40, and is sucked into the first compressor 11 again via the gas pipe 2, the fourth check valve 33, the four-way selector valve 12 and the accumulator 14. In this way, the hot water supply air conditioning system 300 performs the room/water cooling operation. It is assumed that during the room/water cooling operation, the first valve units 44 are controlled to be closed, and the second valve units 45 are controlled to be opened.

As the pressure in the gas pipe 2 is low, and the pressure in the liquid pipe 1 is high, the refrigerant naturally flows through the third and the fourth check valves 32 and 33. During the room/water cooling operation, the refrigerant passing through the second flow controller 38 partially flows into the bypass pipe 6. Then the pressure of the refrigerant is reduced to the low pressure by the third flow controller 39 and the heat exchange is performed with the refrigerant flowing into the first branch portion 41 on the load unit side by the second heat exchange portion 31. The first heat exchanger 37 performs the heat exchange with the refrigerant flowing into the second flow controller 38. The vaporized refrigerant is sucked into the first compressor 11 through the gas pipe 2 via the fourth check valve 33, the four-way selector valve 12 and the accumulator 14.

Meanwhile, the heat exchange is performed by the first and the second heat exchange portions 37 and 31 such that the refrigerant is cooled to have a sufficient supercool level. The thus cooled refrigerant flowing into the first branch portion 41 further flows into the first flow controllers 51a and 51b of the load units 50a and 50b for the room cooling operation and into the first flow controller 51 of the load unit 50 for the water cooling operation via the second check valve 42, and the branch pipes 8a, 8b and 8.

The room/water heating operation will be described. The refrigerant is brought into the high temperature/high pressure state by the first compressor 11, and discharged therefrom to flow into the relay unit 30 via the four-way selector valve 12, the gas pipe 2, the fifth check valve 34 and the liquid pipe 1. The refrigerant flowing into the relay unit 30 further flows into the second branch portion 40 via the gas-liquid separator 36. The refrigerant flowing into the second branch portion 40 flows through the first valve units 44, and the branch pipes 9a, 9b and 9, and further flows into the first load heat exchangers 52a and 52b of the respective load units 50a and 50b.

The refrigerant flowing into the first load heat exchangers 52a and 52b exchanges heat with air and is condensed to liquid. That is, the refrigerant radiates heat (warming air) and is liquefied. The room may be heated by the warmed air supplied into the room. The condensed and liquefied refrigerant flows into the first flow controllers 51a and 51b. At this moment, it is preferable to control the openings of the first flow controllers 51*a* and 51*b* in accordance with the supercool level at the outlets of the first load heat exchangers 52*a* and 52*b*, respectively.

As described in Example 1, the heat exchange is performed between the load refrigerant circuit B and the main circuit A in the load unit 50 to heat water passing through the water pipe 3 to supply hot water. The refrigerant flowing into the first flow controllers 51*a*, 51*b* and 51 flows into the first branch portion 41 via the branch pipes 8*a*, 8*b* and 8. Then the refrigerant passes through the first check valves 43 to join at the joint portion 23, and further flows into the third flow controller 39. The liquid refrigerant is depressurized by the third flow controller 39 to be transformed into the low pressure two-phase state of gas and liquid.

The refrigerant in the two-phase state flows through the bypass pipe 6, the second heat exchanger 31 and the first heat exchanger 37, and further flows into the gas pipe 2. It then passes through the sixth check valve 35 and flows into the heat source heat exchanger 13 to exchange heat with outdoor air so as to be vaporized to gas. That is, the refrigerant absorbs heat from outdoor air (cooling outdoor air) so as to be transformed into the gas. The vaporized gaseous refrigerant flows out from the heat source heat exchanger 13 and is sucked into the first compressor 11 again through the gas pipe 2 via the four-way selector valve 12 and the accumulator 14. The hot water supply air conditioning system 300 executes the room/water heating operation in such a manner. In the aforementioned state, the second valve units 45 are controlled to be closed, and the first valve units 44 are controlled to be opened. As the pressure in the gas pipe 2 is low, and the pressure in the liquid pipe 1 is high, the refrigerant naturally flows to pass through the fifth and the sixth check valves 34 and 35.

The heating/cooling simultaneous operation (mainly heating) will be described. In this case, the load units 50*a* and 50*b* perform the room heating operation, and the load unit 50 performs the water cooling operation. The refrigerant is brought into the high temperature/high pressure state by the first compressor 11, and discharged therefrom to flow into the relay unit 30 via the four-way selector valve 12, the gas pipe 2, the fifth check valve 34 and the liquid pipe 1. The refrigerant flowing into the relay unit 30 passes through the gas-liquid separator 36 and flows into the second branch portion 40. The refrigerant flowing into the second branch portion 40 passes through the first valve units 44 connected to the load units 50*a* and 50*b*, the branch portions 9*a* and 9*b* sequentially to flow into the load units 50*a* and 50*b* for the room heating operation.

The refrigerant flowing into the first load heat exchangers 52*a* and 52*b* exchanges heat with air to be condensed to liquid. That is, the refrigerant radiates heat (warm air) to be condensed into the liquid. The condensed and liquefied refrigerant flows into the first low controllers 51*a* and 51*b* and is depressurized a little to the pressure between the high pressure and the low pressure (intermediate pressure). The first flow controllers 51*a* and 51*b* are controlled to be substantially in fully opened state in accordance with the supercool level at the outlets of the first load heat exchangers 52*a* and 52*b*. The refrigerant at the intermediate pressure passes through the branch pipes 8*a* and 8*b* to flow into the first branch portion 41. The refrigerant then passes through the first check valve 43 to join with other refrigerant at the joint portion 23.

On the other hand, the refrigerant flowing into the load unit 50 which performs the water cooling operation allows a part of the refrigerant joined at the joint portion 23 in the first branch portion 41 to reach the joint portion 22 in the first branch portion via the second heat exchanger 31, to pass through a second check valve 42 and the branch pipe 8, and to flow into the first load heat exchanger 52. In the load unit 50, the heat exchange is performed between the load refrigerant circuit B and the main circuit A to cool water passing through the water pipe 3. The gaseous refrigerant flows into the gas pipe 2 via a second valve unit 45 connected to the load unit 50 in the second branch portion 40.

The refrigerant flowing from the load units 50*a* and 50*b* into the joint portion 23 in the first branch portion 41 of the relay unit 30, used for the room heating operation partially passes through the third flow controller 39 controlled to make the difference between the high pressure in the liquid pipe 1 and the intermediate pressure in the first branch portion 41 constant, and flows into the bypass pipe 6 to reach the gas pipe 2. It then joins with the refrigerant passing through the load unit 50 to flow through the gas pipe 2 and further flows into the heat source heat exchanger 13 via the sixth check valve 35 so as to be vaporized to gas. The gaseous refrigerant is sucked into the first compressor 11 via the four-way selector valve 12 and the accumulator 14.

In the aforementioned state, the second valve units 45 and the first valve units 44 connected to the load units 50*a* and 50*b* for the room heating operation are controlled to be closed and opened, respectively. The first valve unit 44 and the second valve unit 45 connected to the load unit 50 for the water cooling operation are controlled to be closed and opened, respectively. As the pressure in the gas pipe 2 is low, and the pressure in the liquid pipe 1 is high, the refrigerant naturally flows to the fifth and the sixth check valves 34 and 35. The load units 50*a* and 50*b* are allowed to perform the room heating operation, and the load unit 50 is allowed to perform the water cooling operation simultaneously.

In the case where the load units 50*a* and 50*b* are allowed to perform the room heating operation, and the load unit 50 is allowed to perform the water cooling operation, the first load heat exchangers 52*a* and 52 are capable of radiating heat to the atmosphere simultaneously with absorbing heat from water in the first load heat exchanger 52. This may not lower the evaporation temperature, as the energy for absorbing heat from the heat source heat exchanger 13 is reduced, resulting in the efficient operation of the first compressor 11.

The cooling/heating concurrent operation (mainly cooling) will be described. In this case, the load units 50*a* and 50*b* perform the cooling operation, and the load unit 50 performs the water heating operation. The refrigerant is brought into the high temperature/high pressure state by the first compressor 11, and discharged therefrom to flow into the heat source heat exchanger 13 via the four-way selector valve 12. The refrigerant flowing into the heat source heat exchanger 13 exchanges heat with outdoor air by a certain amount to be transformed into the high temperature/high pressure refrigerant in the gas-liquid state. The resultant refrigerant flows into the relay unit 30 through the liquid pipe 1 via the third check valve 32. The refrigerant flowing into the relay unit 30 is separated into the gas refrigerant and the liquid refrigerant by the gas-liquid separator 36.

The gas refrigerant flows into the first load heat exchanger 52 in the load unit 50 for the water heating operation through the first valve units 44 in the second branch portion 40 and the branch pipe 9. The refrigerant flowing into the first load heat exchanger 52 exchanges heat with the refrigerant flowing through the load refrigerant circuit B so as to be condensed to liquid. In the load refrigerant circuit B, the refrigerant which has been brought into the high temperature/high pressure state by the second compressor 53 is discharged therefrom to flow into the second load heat exchanger 54 via the four-way selector valve (not shown). The refrigerant flowing into the second load heat exchanger 54 exchanges heat with water passing through the water pipe 3 so as to be condensed to liquid. The resultant refrigerant flows into the second flow controller 55 through the load refrigerant pipe 56. The refrigerant flowing into the second flow controller 55 is depressurized and converted into the refrigerant in the low pressure gas-liquid state.

The condensation temperature of the gas refrigerant flowing through the load refrigerant circuit B to be liquefied through the heat exchange with water passing through the water pipe 3 in the second load heat exchanger 54 is in the range from 80° C. to 100° C., so that water can be heated to a high temperature. This makes it possible to heat water passing through the water pipe 3 to provide hot water at the high temperature. Meanwhile, the liquefied refrigerant discharged from the first load heat exchanger 52 flows into the first flow controller 51 which is controlled into the substantially fully opened state in accordance with the supercool level at the outlet of the first load heat exchanger 52.

The pressure of the refrigerant is slightly reduced by the first flow controller 51 to the pressure between the high pressure and the low pressure (intermediate pressure). The refrigerant then is discharged from the first flow controller 51. Thereafter, the refrigerant flows into the bypass pipe 6 from the joint portion 23 through the branch pipe 8 and the first check valve 43 in the first branch portion 41. The pressure of the refrigerant is reduced to the low pressure by the third flow controller 39 to reach the second heat exchanger 31 where the heat exchange with the refrigerant flowing into the first branch portion 41 is performed. In the first heat exchanger 37, the refrigerant exchanges heat with the refrigerant flowing into the second flow controller 38 to be vaporized. The thus gaseous refrigerant flows into the gas pipe 2.

Meanwhile, the rest of the liquid refrigerant separated in the gas-liquid separator 36 in the relay unit 30 is cooled through the heat exchange in the first heat exchanger 37, and flows into the second flow controller 38. The second flow controller 38 is controlled to make the difference between the high pressure and the intermediate pressure constant. The refrigerant discharged from the second flow controller 38 is further cooled by the second heat exchanger 40 sufficiently so as to flow into the joint portion 22 in the first branch portion 41. It then flows into the load units 50a and 50b for the room cooling operation.

That is, the refrigerant flowing into the joint portion 22 flows into the load units 50a and 50b via the second check valve 42 connected thereto through the branch pipes 8a and 8b. The refrigerant then reaches the first flow controllers 51a and 51b. At this moment, the first flow controllers 51a and 51b are controlled in accordance with the overheat level at the outlets of the first load heat exchangers 52a and 52b. Accordingly, the refrigerant is depressurized to a low pressure by the first flow controllers 51a and 51b.

The refrigerant then exchanges heat with room air by the first load heat exchangers 52a and 52b, and is vaporized to gas to cool the room. Thereafter, the gaseous refrigerant flows into the second branch portion 40 through the branch pipes 9a and 9b, and further flows into the gas pipe 2 via the second valve units 45 in the second branch portion 40. The refrigerant flowing into the gas pipe 2 joins with the refrigerant flowing into the gas pipe 2 via the bypass pipe 6 used for heating in the load unit 50, and is sucked into the first compressor 11 via the fourth check valve 33, the four-way selector valve 12 and the accumulator 14.

Then the second valve units 45 and the first valve units 44 connected to the load units 50a and 50b for the room cooling operation are controlled to be opened and closed, respectively. The second valve units 45 and the first valve units 44 connected to the load unit 50 for the water heating operation are controlled to be closed and opened, respectively. As the pressure in the gas pipe 2 is low, and the pressure in the liquid pipe 1 is high, the refrigerant naturally flows to the third and the fourth check valves 32 and 33. In this way, the load units 50a and 50b perform the room cooling operations and the load unit 50 performs the water heating operation simultaneously.

In the case where the load units 50a and 50b perform the room cooling operation, and the load unit 50 performs the water heating operation, the first load heat exchangers 52a and 52 absorb heat from air, and the first load heat exchanger 52 radiates heat to water simultaneously. As the calorific value of radiating heat from the heat source heat exchanger 13 is reduced, the increase rate of the high pressure becomes small. This makes it possible to perform the efficient operation of the first compressor 11. The first flow controllers 50, 50a and 50b may be provided within the heat source unit 10.

Example 4

Figure 5:
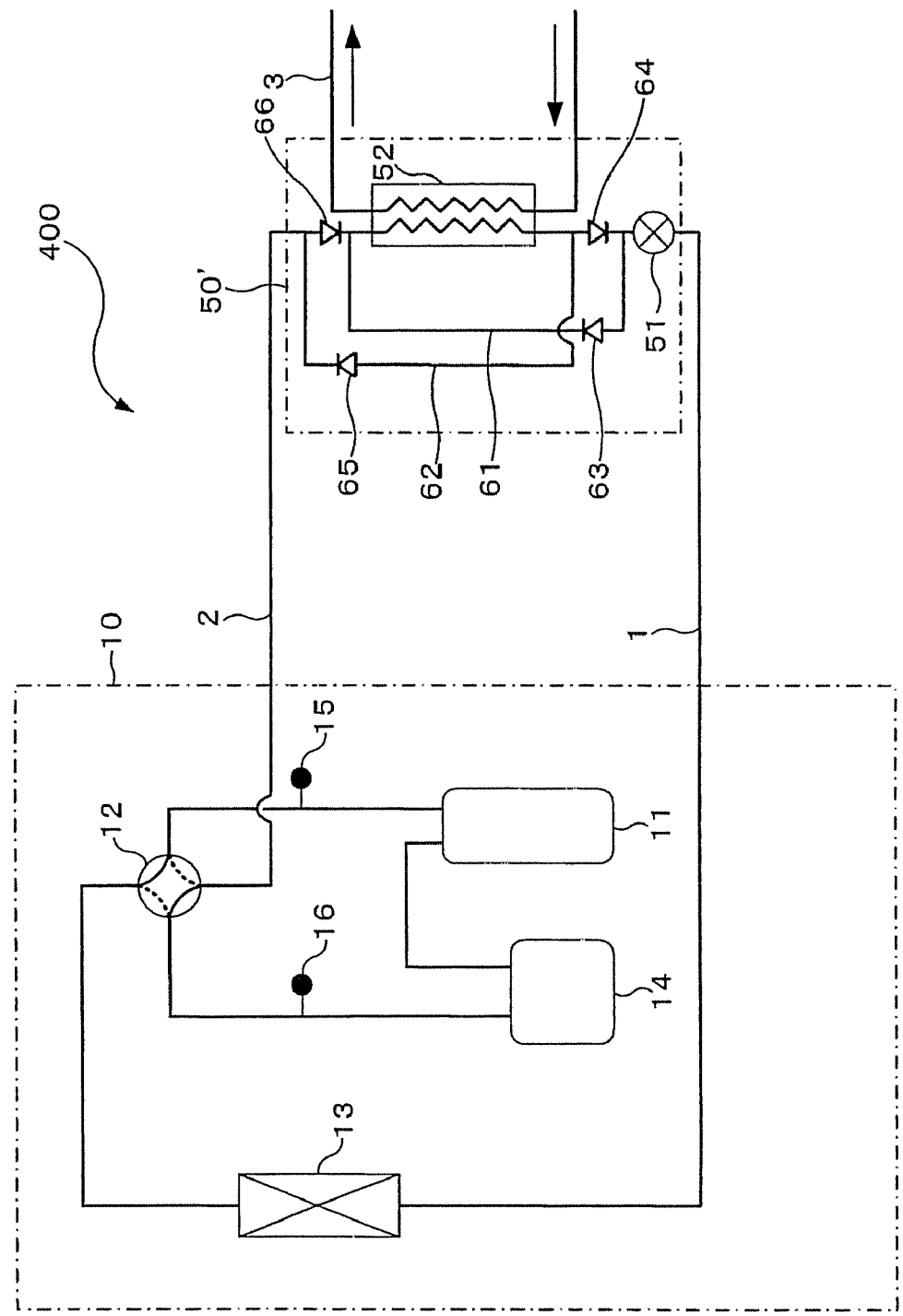
FIG. 5 shows a structure of a refrigerant circuit in the hot water supply system according to Example 4.

FIG. 5 shows the structure of a refrigerant circuit of a hot water supply system 400 according to Example 4 of the present invention. Referring to FIG. 5, the structure of the refrigerant circuit of the hot water supply system 400 will be described. Likewise the hot water supply system 100 according to Example 1, the hot water supply system 400 is installed in the building or condominium as a heat pump system using a refrigerating cycle for circulating the refrigerant (heat pump cycle) to supply water at low, intermediate, and high temperatures used for the heated pool, floor heating, shower, bath, and drinking. In the example, the feature different from that of Example 1 will only be described, and the same elements as those shown in Example 1 will be designated with the same reference numerals, and explanations thereof, thus will be omitted.

In Example 1, the load refrigerant circuit B is provided in the load unit 50. Meanwhile in Example 4, the refrigerant flow in a load unit 50' is controlled to efficiently perform the heat exchange with water passing through the water pipe 3. That is, in the hot water supply system 400, the refrigerant flowing through the main circuit A in the load unit 50' is always made opposite the flow of water in the water pipe 3 to improve the heat exchange efficiency. The flow of water in the water pipe 3 is shown by the arrow in FIG. 5.

In the hot water supply system 400, the liquid pipe 1 and the gas pipe 2 are connected to first and second bypass pipes 61 and 62, and a seventh check valve 63 (corresponding to the third check valve in claims), an eighth check valve 64 (corresponding to the second check valve in claims), a ninth check valve 65 (corresponding to the fourth check valve in claims) and a tenth check valve 66 (corresponding to the first check valve in claims) are provided. Those check valves are controlled to allow the refrigerant flowing through the second load heat exchanger 54 to flow only in one direction. The first and the second bypass pipes 61 and 62 branching off from the gas pipe 2 at one end of the outlet/inlet (inlet of the refrigerant flowing into the first load heat exchanger 52 during the heating operation) of the first load heat exchanger 52 are connected to the other end of the outlet/inlet (between the first load heat exchanger 52 and the first flow controller 51) of the first load heat exchanger 52.

The branch point of the first bypass pipe 61 (branch portion at the inlet of the load heat exchanger 52) is formed downstream of the branch point of the second bypass pipe 62 (closer to the inlet of the load heat exchanger 52). The connecting point of the first bypass pipe 61 (the portion connected at the outlet of the load heat exchanger 52) is provided downstream of the connecting point of the second bypass pipe 62 (far from the outlet of the load heat exchanger 52). The seventh check valve 63 is provided in the first bypass pipe 61 to allow the refrigerant going to flow from the first flow controller 51 into the first load heat exchanger 52 to flow into the inlet of the first load heat exchanger 52 without allowing the refrigerant to pass the first load heat exchanger 52.

The eighth check valve 64 is provided in the liquid pipe 1 and between the connecting point in the first bypass pipe 61 and the connecting point in the second bypass pipe 62 on the outlet side of the first load heat exchanger 52, and structured to allow the refrigerant to flow only in the direction from the first load heat exchanger 52 to the first flow controller 51. The ninth check valve 65 is provided in the second bypass pipe 62, and structured to allow the refrigerant going to flow from the first load heat exchanger 52 to the first flow controller 51 to flow only into the inlet side of the first load heat exchanger 52 without allowing the refrigerant to pass the first load heat exchanger 52. The tenth check valve 66 is provided in the gas pipe 2 and between the branch point in the first bypass pipe 61 and the branch point in the second bypass pipe 62 on the inlet side of the first load heat exchanger 52, and structured to allow the refrigerant to flow only in the direction to the first load heat exchanger 52.

With the load refrigerant circuit B' in the load unit 50', the liquid refrigerant flowing from the heat source unit 10 through the liquid pipe 1 is depressurized to the low pressure by the first flow controller 51 during the water cooling operation and becomes into the two-phase state. The refrigerant then flows into the second load heat exchanger 52 via the seventh check valve 63 to exchange heat with water passing through the water pipe 3 so as to be vaporized to gas. It further flows into the gas pipe 2 via the ninth check valve 65 to return to the heat source unit 10. That is, the flow of the refrigerant is made opposite the flow of water in the first load heat exchanger 52 during the water cooling operation.

As each flow of the refrigerant and water is made opposite inside the first load heat exchanger 52, the heat exchange is performed between water flowing into the first load heat exchanger 52 through the water pipe 3 and the refrigerant discharged from the first load heat exchanger 52, and between water discharged from the first heat exchanger 52 through the water pipe 3 and the refrigerant flowing into the first load heat exchanger 52. This makes it possible to improve efficiency of the heat exchange between water and the refrigerant in the first load heat exchanger 52.

During the water heating operation in the load unit 50', the high pressure gas refrigerant flows into the first load heat exchanger 51 via the tenth check valve 66 from the heat source unit 10 through the gas pipe 2, and exchanges heat with water passing through the water pipe 3 so as to be condensed to liquid. Then the refrigerant is depressurized to the low pressure by the first flow controller 51 via the eighth check valve 64 and becomes into the two-phase state. It then returns to the heat source unit 10 through the liquid pipe 1. In the water heating operation, each flow of water and the refrigerant may be made opposite inside the first load heat exchanger 52.

Each flow of the refrigerant and water is made opposite inside the first load heat exchanger 52 such that the heat exchange may be performed between water flowing into the first load heat exchanger 52 through the water pipe 3 and the refrigerant discharged from the first load heat exchanger 52, and between water discharged from the first load heat exchanger 52 through the water pipe 3 and the refrigerant flowing into the first load heat exchanger 52. This makes it possible to improve the heat exchange efficiency between water and the refrigerant inside the first load heat exchanger 52. When the load unit 50'D is activated for the cooling operation or water heating operation, each flow of water and the refrigerant may be made opposite inside the first load heat exchanger 52.

In Example 4, the load refrigerant circuit B in the load unit 50' is not shown in the drawing. The load refrigerant circuit B may be provided in the load unit 50' like the load unit 50. In the aforementioned case, the load refrigerant pipe 56 is connected to the first and the second bypass pipes 61 and 62, the eighth check valve 64 is disposed between the second compressor 53 and the second load heat exchanger 54, and the tenth check valve 66 is disposed between the second flow controller 55 and the second load heat exchanger 54.

The first bypass pipe 61 branches off from the load refrigerant pipe 56 at one end of the outlet/inlet of the second load heat exchanger 54 and branches off from the load refrigerant pipe 56 at the other end of the outlet/inlet of the second load heat exchanger 54. The second bypass pipe 62 branches off from the load refrigerant pipe 56 at the point farther apart from the second load heat exchanger 54 than the branch point of the first bypass pipe 61, so as to be connected to the load refrigerant pipe 56 at the point closer to the second load heat exchanger 54 than the connecting point of the first bypass pipe 61.

The hot water supply system 400 may be replaced with the air conditioning system for allowing the load unit 50' to serve as the interior unit. In the aforementioned case, the operation for supplying cold water corresponds with the room cooling operation, and the operation for supplying hot water corresponds with the room heating operation. The structure of the load unit 50' may be made by combining the load unit 50 according to the Examples 1 to 3. This allows the load refrigerant circuit B to be mounted, and each flow direction of water and refrigerant to be made opposite, resulting in providing all the advantages derived from the respective examples. The first flow controller 50 may be mounted inside the heat source unit 10.

The invention claimed is:
1. A heat pump system comprising:
a heat source unit including a first compressor, a flow passage switch valve, and a heat source heat exchanger;
a first load unit including a first flow controller, a first load heat exchanger, a second compressor, a second load heat exchanger, and a second flow controller;
a second load unit having a third flow controller and a third load heat exchanger connected in series; and
a relay unit for selectively connecting one of an outlet and an inlet of a refrigerant of the first load heat exchanger in the first load unit to any one of an outlet and an inlet of the refrigerant of the heat source unit, connecting the other of the outlet and the inlet of the first load heat exchanger in the first load unit to the other of the outlet and the inlet of the heat source unit via the first flow controller in the first load unit, selectively connecting one of an outlet and an inlet of the refrigerant of the third load heat exchanger in the second load unit to any one of the outlet and the inlet of the heat source unit, and connecting the other of the outlet and the inlet of the third load heat exchanger in the second load unit to the other of the outlet and the inlet of the heat source unit via the third flow controller in the second load unit, wherein:

the first flow controller and the first load heat exchanger in the first load unit are arranged in parallel with the third flow controller and the third load heat exchanger in the second load unit;

a main circuit is formed by sequentially connecting the first compressor, the flow passage switch valve, the heat source heat exchanger, the flow controllers and the load heat exchangers in the first load unit and the second load unit, which are arranged in parallel, with a refrigerant pipe line; and a load refrigerant circuit is formed by sequentially connecting the second compressor, the second load heat exchanger, the second flow controller, and the first load heat exchanger in the first load unit, with a load refrigerant pipe line.

2. The heat pump system of claim 1, wherein the first load unit includes:

a first check valve disposed in a refrigerant pipe connected to one end of an outlet/inlet of the second load heat exchanger to allow the refrigerant to flow only in a direction from the one end of the outlet/inlet of the second load heat exchanger to the other end;

a second check valve disposed in a refrigerant pipe connected to the other end of the outlet/inlet of the second load heat exchanger to allow the refrigerant to flow only in a direction from the one end of the outlet/inlet of the second load heat exchanger to the other end;

a first bypass pipe branching off from the load refrigerant pipe line at a point downstream of the second check valve to be connected to a point between the first check valve and the second load heat exchanger;

a third check valve disposed in the first bypass pipe to allow the refrigerant to flow only in a direction from the branch point to the connecting point;

a second bypass pipe branching off from the load refrigerant pipe line at a point between the second load heat exchanger and the second check valve to be connected to a point upstream of the first check valve; and a fourth check valve disposed in the second bypass pipe to allow the refrigerant to flow only in a direction from the branch point to the connecting point.

3. The heat pump system of claim 1, wherein a water pipe is connected to the second load heat exchanger in the first load unit.

4. The heat pump system of claim 2, wherein a water pipe is connected to the second load heat exchanger in the first load unit.

5. The heat pump system of claim 1, wherein R134a is used as the refrigerant in the load refrigerant circuit.

6. The heat pump system of claim 2, wherein R134a is used as the refrigerant in the load refrigerant circuit.

7. The heat pump system of claim 3, wherein R134a is used as the refrigerant in the load refrigerant circuit.

8. A heat pump system comprising:

a heat source unit including a first compressor, a flow passage switch valve, and a heat source heat exchanger;

a first load unit including a first flow controller, a first load heat exchanger, a second compressor, a second load heat exchanger, and a second flow controller;

a second load unit having a third flow controller and a third load heat exchanger connected in series; and a relay unit for selectively connecting one of an outlet and an inlet of a refrigerant of the first load heat exchanger in the first load unit to any one of an outlet and an inlet of the refrigerant of the heat source unit, connecting the other of the outlet and the inlet of the first load heat exchanger in the first load unit to the other of the outlet and the inlet of the heat source unit via the first flow controller in the first load unit, selectively connecting one of an outlet and an inlet of the refrigerant of the third load heat exchanger in the second load unit to any one of the outlet and the inlet of the heat source unit, and connecting the other of the outlet and the inlet of the third load heat exchanger in the second load unit to the other of the outlet and the inlet of the heat source unit via the third flow controller in the second load unit, wherein:

the first flow controller and the first load heat exchanger in the first load unit are arranged in parallel with the third flow controller and the third load heat exchanger in the second load unit;

a main circuit being formed by sequentially connecting the first compressor, the flow passage switch valve, the heat source heat exchanger, the flow controllers and the first load heat exchangers in the first load unit and the second load unit, which are arranged in parallel, with a refrigerant pipe line;

a load refrigerant circuit is formed by sequentially connecting the second compressor, the second load heat exchanger, the second flow controller, and the first load heat exchanger in the first load unit, with a load refrigerant pipe line;

wherein the first load unit includes:

a first check valve disposed in a refrigerant pipe connected to one end of an outlet/inlet of the second load heat exchanger to allow the refrigerant to flow only in a direction from the one end of the outlet/inlet of the second load heat exchanger to the other end;

a second check valve disposed in a refrigerant pipe connected to the other end of the outlet/inlet of the second load heat exchanger to allow the refrigerant to flow only in a direction from the one end of the outlet/inlet of the second load heat exchanger to the other end;

a first bypass pipe branching off from the load refrigerant pipe line at a point downstream of the second check valve to be connected to a point between the first check valve and the second load heat exchanger;

a third check valve disposed in the first bypass pipe to allow the refrigerant to flow only in a direction from the branch point to the connecting point;

a second bypass pipe branching off from the load refrigerant pipe line at a point between the second load heat exchanger and the second check valve to be connected to a point upstream of the first check valve; and a fourth check valve disposed in the second bypass pipe to allow the refrigerant to flow only in a direction from the branch point to the connecting point.

* * * * *